I. KITSEE.
QUADRUPLEX TELEGRAPHY.
APPLICATION FILED DEC. 20, 1911. RENEWED DEC. 30, 1916.
1,220,756.
Patented Mar. 27, 1917.
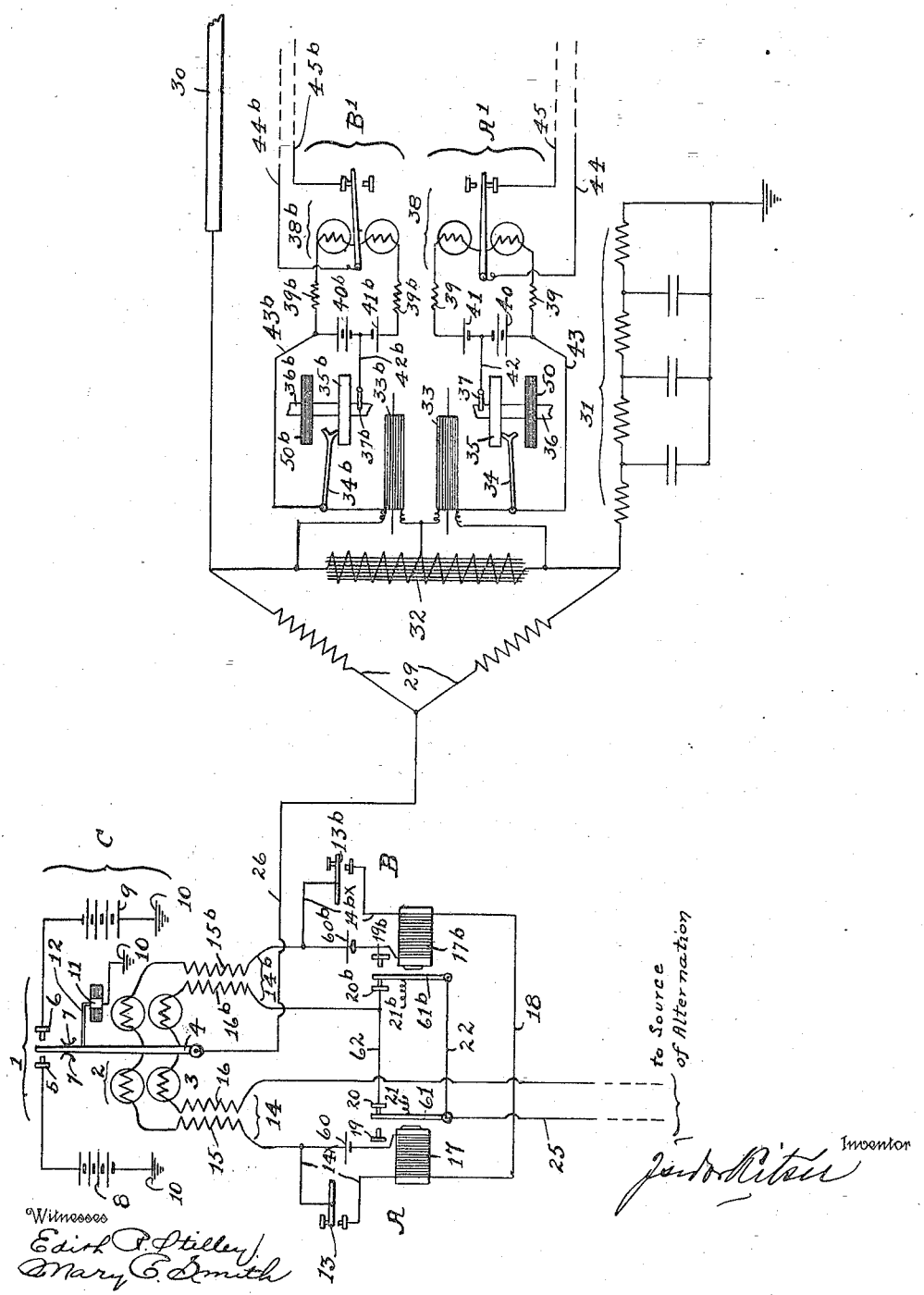
Witnesses
Edith P. Stiller
Mary E. Smith
Inventor

UNITED STATES PATENT OFFICE.

ISIDOR KITSEE, OF PHILADELPHIA, PENNSYLVANIA, ASSIGNOR, BY MESNE ASSIGNMENTS, TO AMERICAN TELEPHONE AND TELEGRAPH COMPANY, OF NEW YORK, N. Y., A CORPORATION OF NEW YORK.

QUADRUPLEX TELEGRAPHY.

1,220,756. Specification of Letters Patent. Patented Mar. 27, 1917.

Application filed December 20, 1911, Serial No. 666,867. Renewed December 30, 1916. Serial No. 139,967.

*To all whom it may concern:*

Be it known that I, ISIDOR KITSEE, citizen of the United States, residing at Philadelphia, in the county of Philadelphia and State of Pennsylvania, have invented certain new and useful Improvements in Quadruplex Telegraphy, of which the following is a specification.

My invention relates to an improvement in quadruplexing telegraphy useful for lines with great capacity, such for instance as submarine cables.

The peculiar condition of submarine cables makes it impossible to use the system of quadruplexing as is now practised on land lines and new methods have to be provided to accomplish the quadruplexing of such lines as submarine cables.

For the purpose of illustrating one form my invention may take, I have reference to the accompanying drawing which illustrates in diagram one terminal of a submarine cable including for this terminal two transmitting and two receiving stations.

The transmitting stations embrace here means to impress upon the line reversals of practically alike intensity and duration, transmitting means and means to change the sequence of said reversals, in accordance with the signals to be transmitted, and embrace also means to connect the cable automatically to the ground or return.

The receiving stations comprise here two line relays inserted in the cross circuit of the bridge and means to translate the movement of the movable part of the line relays.

I will first describe the transmitting stations.

I am aware that a simple generator of alternating currents may be employed for the purpose of normally impressing upon the line pulses of opposite polarity.

I am also aware that the impressing upon the line of such alternating pulses may be accomplished with the aid of a revolving commutator and two series of batteries or split batteries, so called, but I have found that, in practice, for the purpose of changing the alternation in accordance with my system, it is best to make use of a polarized relay adapted to connect with one or the other sources of current and use appropriate means for actuating this relay in a manner, so as to alternately connect with one or the other of said sources.

In the drawing; A and B are the two transmitting stations, as entireties, and C is the intermediate organism, as I call it, operatively related to both stations. The intermediate organism comprises here the polarized relay indicated as an entirety by the numeral 1. This relay comprises here the two pairs of electromagnetic coils 2 and 3, the armature 4, the stops 5 and 6 and the springs 7, for the purpose of holding the armature in its zero position when not actuated and away from both of the stops. 8 and 9 are two sources of current; the source of current 8 connected with the positive pole to the stop 5 and grounded at 10 with the negative pole; the source of current 9 connected with the negative pole to stop 6 and grounded with the positive pole at 10. 11 is a contact grounded at 10. 12 is a conductor carried by the armature 4 and adapted to connect with the contact 11 when the armature is in its zero position.

The transmitting station A comprises here the transmitting key 13 adapted to be manually operated, but it is obvious that instead of this key, automatic means for transmission may be substituted therefor. This station also comprises the converter or inductorium 14, the primary 15 of which is connected with one terminal of the coil of electromagnets 2 and with the other terminal to the source of current 60 which, in turn, is connected to one terminal of the coil of electromagnet 17.

Similar parts of station B are indicated by similar numerals as in station A, with the exception that each numeral carries the designation "b".

18 is a circuit connecting the free terminal of the coil of electromagnet 17 to the free terminal of the coil of electromagnet $17^b$. The shunt circuit $14^x$ connects the key 13 in shunt to the battery 60 and coil of electromagnet 17 and the shunt circuit $14^{bx}$ connects the key $13^b$ in shunt to the battery 60$^b$ and the coil of electromagnet 17$^b$. The electromagnet 17 is provided with the armature 61 and the stops 19 and 20 and is held normally against the stop 20 by spring 21. The armature 61$^b$ of electromagnet 17$^b$ rests normally against stop 20$^b$ and both the stops 20 and 20$^b$ are connected together through conductor 62 and the armatures 61 and 61$^b$ are connected together through conductor 22. 16 and 16$^b$ are the secondaries of the converters 14 and 14$^b$, respectively. These secondaries are connected each with one terminal to one terminal of the coils of electromagnets 3. The free terminal of 16$^b$ is here shown as to be connected to conductor 62 and the free terminal of the secondary 16 is here illustrated as to go to a source of alternating current. To the armature 61 of electromagnet 17 is connected the conductor 25 also supposed to be connected to the source of alternating current. The armature 4 of relay 1 is connected through wire 26 with the junction of the bridge-arms 29, 29. One of these bridge-arms is connected to the cable 30 and the other bridge-arm is connected to the artificial line 31. In the cross circuit of this bridge is included the inductive resistance 32.

In my endeavor to employ as much as possible existing devices, I make use of a device such as is known as the siphon recorder with such changes as are deemed necessary for the purpose of my invention.

If it is required that the receiving device should translate the incoming impulses by producing a recording line, then the usual siphon may be employed, but I have illustrated in this drawing means to translate the incoming impulses with the aid of a localized electromagnetic device into sound or record as desired, and for this purpose, I have illustrated the usual glass siphon as replaced by a conductor adapted to make and break a local circuit. But as in my system, it is preferred that this conductor should only answer to a pulse of predetermined polarity and as it is best not to prevent the coil itself from assuming the different positions for both polarities, I have recourse to the following simple change in the construction of the recorder of today:—

This recorder, as is well known, is generally provided with two suspension fibers connecting the movable coil with the cradle. One of these fibers compels the cradle and, therefore, the metallic conductor attached thereto to follow the movements of the coil to the right; the second of the fibers compelling the cradle and, therefore, the conductor attached thereto to follow the movements of the coil to the left. If, now, one of the fibers is cut, then the conductor is only capable of following the movement of the coil in one direction.

To prepare, therefore, two siphon recorders for my special purpose, it is only necessary to cut one fiber of each instrument in a manner so that the conductor of one instrument should only be able to follow the movements of the coil through a positive pulse and the conductor of the second instrument should only be able to follow the movements of the coil through a negative pulse and I have arranged and connected both coils, so that they should, when no current is flowing over the line, close through their conductors, each, a localized circuit and open these localized circuits, one through the arrival of a positive pulse and the other through the arrival of a negative pulse.

I will now describe the receiving organism as illustrated in this drawing.

The receiving organism, designated as an entirety by A', is supposed to be related to the transmitting station A of the distant terminal and the receiving organism designated as an entirety by B' is supposed to relate to the transmitting organism of the distant terminal designated by B. The parts of the station B', which are similar to the parts of the station A', are designated by similar numerals with the exception that the letter "b" is added thereto.

I deemed it unnecessary to illustrate in detail the different arrangements of the siphon recorder of today and I have only illustrated the same in conventional sign showing the coils of the siphons, their connections and the conductors replacing the siphons.

The devices as illustrated in organism A' are designated as follows:—

33 is the moving coil connected in the cross circuit of the bridge. 34 is the moving conductor adapted to move in unison with the coil in one direction. 35 is a conductor here shown in the form of a disk and secured to the conducting shaft 36. 50 is a nonconducting disk secured to the same shaft. This shaft is adapted to be revolved with the aid of suitable means. 37 is a brush contacting with the shaft. 38 is a polarized relay. The coils of said relay are connected to the resistances 39, 39. 40 and 41 are two sources of current connected in opposition as to each other; the source of current 40 of higher electromotive force than the source 41 and it is preferred that the electromotive force of 40 should be double the force of 41.

In the drawing, the source 40 is illustrated as to consist of two cells and the source 41 as to consist of one cell, but it is obvious that the number of cells have to differ in accordance with requirements.

The resistances 39, 39, are connected to these sources and form with same a closed circuit. 42 and 43 are shunt wires; the wire 42 connecting with the negative pole of the source 40 and brush 37, respectively, and the wire 43 connecting with the positive pole of the source 40 and moving conductor 34, respectively. 44 and 45 are conductors adapted to be attached to desirable translating devices.

I will now describe the operation of this, my system.

It is desired that the transmitting operators of one terminal should inform the receiving operators of the distant terminal that they are placing the transmitting organism in service. This placing of the organism in service does not mean that they are transmitting messages, but it only includes the information that the normal transmission of practically "true reversals" has commenced.

With the aid of such device as occasion requires, the transmitting relay 1 is actuated in a manner so that its armature 4 should alternately connect with the stops 5 and 6, thereby alternately impressing upon the line pulses of positive and negative polarity and of practically the same duration and intensity.

At the receiving stations of the distant terminal, the movable conductors, which normally rest on the revolving conducting disk, will now commence to vibrate in alternate succession and it is supposed that the positive pulses of A actuate the movable conductor of A' and the negative pulses of B actuate the movable conductor of B'.

Through the vibration of the movable conductor, the shunt circuit of the source of current 40 will be alternately made and broken and through this quick action, the tongue of the relay 38 will alternately make contact with one of its contact stops but the time of contacting with one or the other stops will be so short that with proper adjustment, the translating devices connected to the circuit of this relay will not answer.

Normally, therefore, that is, when the transmitting station sends out in quick succession pulses alternately of opposite polarity, the translating device at the receiving station will not be affected.

It is now supposed that the operator of the transmitting station A desires to transmit a message. He manipulates the key—if such is present—in a manner as is customary on land telegraphy,—closing the key for a short period to denote a dot and for a longer period to denote a dash.

The operation of this key will result in the following changes:—

First:—The battery 60 will be short circuited and this short circuit will include the coil of electromagnet 17. Through the short circuiting of this battery 60, the force of the battery 60ᵇ will become free and the current from 60ᵇ will flow through coils 2. This force should be greater than the force of the alternations flowing through the coils 3 and it is supposed that the flow of the current from battery 60ᵇ will drive the armature 4 toward and in contact with stop 5, thereby connecting the cable with the source 8 and impressing upon the line a positive current.

As long as the key remains depressed, the armature will remain in contact with this stop and the positive current will flow over the line; but at the same time, the flow of the current through the primary 15 of the inductorium 14 will induce an impulse in the secondary 16 and this induced impulse should also be of a direction and force to augment the force of the battery 60 and drive the armature toward and in contact with stop 5.

Second:—Through the energizing of the electromagnet 17, the armature 61 will be drawn from the stop 20 and toward and in contact with the stop 19. This breaking of the contact will not alter the electric relation of any part of the device as far as the practical working is concerned.

When, now, the operator releases his key, the force of the battery 60 will again oppose the force of battery 60ᵇ and the effect of both batteries will be neutralized; but the opening of the key and, therefore, the ceasing of the flow of the current in the primary 15 will result in the generation of a secondary impulse in secondary 16 and this impulse being opposite to the formerly induced impulse, will drive the armature 4 toward and in momentary contact with the stop 6.

When the effect of this pulse has died away, then the alternations flowing through coil 3 will again resume their normal action.

It is, therefore, seen that when A sends a current over the line, he impresses upon that line a positive current during the whole time that the signal should last and at the end of these signals, a negative pulse is impressed upon the line independent of the force of the alternating current flowing through the coil 3.

At the receiving stations, the two coils of the line relays and their respective conductors are so arranged that the conductor 34 of A' will be forced from its normal or zero position (contacting with 35) through a negative pulse and the conductor 34ᵇ of the coil 33ᵇ will be forced from its normal position through a positive pulse.

When, now, through the manipulation of the key at the transmitting station A, the normal sequence of the pulses is interrupted and a positive current of comparatively long duration is transmitted over the line, the movable conductor of the station B' will be drawn from its normal resting point but the movable conductor of station A' will remain for a comparatively long time at its zero position shunting for the whole period the battery 40 and as it is supposed that the force of the battery 41 will drive the armature of the relay 38 in contact with that stop which has the circuit 45 connected therewith, it is obvious that the electromagnetic devices connected to this circuit will be able to answer and will thereby translate the received current into readable characters, sound—if a so-called sounder is connected to this circuit, or record—if a recording device is included in this circuit.

When the operator at the transmitting station B depresses his key, the battery $60^b$ is short circuited and the force of the battery 60 will drive the armature 4 toward and in contact with stop 6, thereby connecting the cable to the negative pole of the source 9. At the same time, the flow of the current through the primary $15^b$ of the inductorium $14^b$ will induce an impulse in secondary $16^b$ and this impulse is adapted to throw the armature 4 in the same direction, that is, toward and in contact with stop 6.

As soon as this key is released, the two batteries 60 and $60^b$ will again neutralize each other but the ceasing of the current-flow through $15^b$ will induce in secondary $16^b$ an impulse opposite to the former induced impulse and will drive the armature toward and in momentary contact with stop 5.

At the receiving station, the movable conductor of A′ will be forced away from its zero position for a greater length of time than normally, but the movable conductor of B′ will contact with its revolving contact for a greater length of time than normally; and as through this the battery $40^b$ is short circuited for such length of time and the force of battery $41^b$ left free and as this force is adapted to drive the armature of the relay $38^b$ in connection with that contact to which the circuit $45^b$ is connected, it is obvious that the translating devices in this circuit will answer.

It is now supposed that both the operators of station A as well as station B depress their keys simultaneously.

Through the depression of both keys, both batteries 60 and $60^b$ will be short circuited, but both electromagnets 17 and $17^b$ will be energized drawing their respective armatures away from the normal contact and thereby breaking the circuit of the coil 3 from its source of alternation.

The resultant effect will be that the armature 4 will remain at its zero position and out of contact with stops 5 or 6 and will connect through 11 and 12 with the ground 10.

At the receiving station, the resultant effect will be that both the moving conductor of the station A′ as well as the moving conductor of the station B′ will remain for a comparatively long time, that is, as long as the signal lasts in connection with their respective contacts and the armature of both localized relays will connect for the same period with the translating circuit and will actuate the devices therein.

It has to be stated that practical experiments have proven that the ground connection of the cable, between the change of polarity impressed on the cable as well as during the time that the sequence of the alternation is entirely interrupted, greatly adds to the efficiency of the system.

At the receiving stations, I have placed in the circuit connecting the localized polar relays the resistances 39 and $39^b$. These resistances should be of a comparatively high value and even 10,000 ohms are not too high for this purpose.

The reason for this insertion of the resistance is that no matter how smooth the surfaces of the revolving conductors 35 and $35^b$ are, practice has proven that a change of resistance always takes place between the moving conductor attached to the relay coil and the revolving conductor. The circuit of the localized relay, therefore, has to be provided with compensating means so as to overcome this disadvantage which otherwise would result therein that the tongue of this localized relay would fluctuate or even be thrown to the opposite side when such should not be the case.

In practice, it was found that the resistance between the moving conductor and the revolving contact (if such contact only lightly presses on this conductor, as in operation it should) fluctuates between 10 to 200 ohms and the insertion, therefore, of 10,000 ohms on each side of the circuit of the localized relay effectually counterbalances this fluctuation.

The transmitting arrangement illustrated, when broadly considered as involving an arrangement whereby normally true reversals or alternations are impressed upon the line, with means for one of the transmitting stations to substitute for said reversals a flow of current or pulses of positive polarity, and means for the other of the transmitting stations to substitute for the reversals a flow of current or pulses of negative polarity, and an arrangement whereby when both transmitting stations are sending no current or pulses are on the line, is not claimed in this application, but is claimed in my co-pending application Serial No. 766,085, filed May 7, 1913, which illustrates a somewhat different transmitting arrangement but one involving the general principles just stated and in which application this principle is broadly claimed.

Having now described my invention, what I claim as new and desire to secure by Letters Patent is:—

1. In quadruplex telegraphy, the method which consists in impressing practically true reversals upon the line when no signal is being sent, substituting for such true reversals an uninterrupted flow of current of one polarity to denote a signal, and impressing upon the line as soon as said signal has ceased a momentary pulse of a polarity opposite to the polarity denoting the signal.

2. In quadruplex telegraphy, two transmitting stations, means operatively related to both stations to transmit practically true reversals, means for one of the stations to substitute for said reversals an uninterrupted flow of current of positive polarity to denote a signal from its station, means for the other of the stations to substitute for the reversals an uninterrupted flow of current of negative polarity to denote a signal from its station, and means to impress upon the line a pulse of a polarity opposite to the polarity denoting the signals as soon as said signals have ceased.

3. In quadruplex telegraphy, two transmitting stations, means operatively related to both stations to transmit practically true reversals, means for one of the stations to substitute for said reversals an uninterrupted flow of current of positive polarity to denote a signal from its station, means for the other of the stations to substitute for said reversals an uninterrupted flow of current of negative polarity to denote a signal from its station, means to impress upon the line a momentary pulse of a polarity opposite to the polarities denoting the signals as soon as said signals have ceased, and means operatively related to both stations to cease the impressing upon the line of any polarity to denote the simultaneous transmission of signals from both stations.

4. In quadruplex telegraphy, two transmitting stations, means operatively related to both stations to transmit practically true reversals, means for one of the stations to substitute for the reversals an uninterrupted flow of current of positive polarity to denote a signal from its station, means for the other of the stations to substitute for the reversals an uninterrupted flow of current of negative polarity to denote a signal from its station, means to impress upon the line a momentary pulse of a polarity opposite to the polarities denoting the signals as soon as said signals have ceased, and means operatively related to both stations to ground the transmitting line directly.

5. In quadruplex telegraphy, the method which consists in substituting for normally transmitted reversals an uninterrupted flow of current of one polarity to denote a signal from one station, an uninterrupted flow of current of opposite polarity to denote a signal from the second station, impressing upon the line a momentary pulse of a polarity opposite to the polarities denoting the signals as soon as said signals have ceased, and substituting a direct ground to denote the simultaneous transmission of signals from both stations.

6. In quadruplex telegraphy, a line of transmission, two transmitting stations for each terminal of said line, the two transmitting stations of each terminal comprising a polarized relay, two sources of current for said relay, one source connected with the positive pole to one of the stops of said relay, the second of said sources connected with the negative pole to the second of the stops of said relay, the armature of said relay connected to the line of transmission, means to vibrate the armature so that the same shall connect with both stops alternately at a predetermined speed, means for said armature to ground the same when the vibrations have ceased, and transmitting means for each of said stations, each of said transmitting means provided with means to change the vibrations of said armature.

7. In a transmitting station for quadruplex telegraphy, transmitting means, means independent of the transmitting means to impress on the line practically true reversals, a line of transmission, and means at the transmitting station to ground said line momentarily between each pulse.

8. In quadruplex telegraphy, a line of transmission, transmitting means, automatic means independent of the transmitting means to normally impress upon the line pulses of alternate polarity, automatic means at the transmitting station to ground the line momentarily between each pulse, and automatic means to ground the line directly if no pulse is transmitted.

9. In quadruplex telegraphy, a line of transmission, two transmitting stations at one terminal of the line, automatic means operatively related to both stations to impress upon the line practically true reversals, said automatic means including a polarized relay, transmitting means for each station, and means operatively related to both of said transmitting means to automatically cease the transmission of said reversals and substitute therefor a direct grounding of the line.

10. In quadruplex telegraphy, in combination with a line of transmission, a transmitting relay provided with two circuits, one circuit adapted to vibrate the armature of said relay, the second circuit provided with transmitting means and adapted to change the sequence of said vibrations.

11. In quadruplex telegraphy, a line of transmission, a transmitting relay provided with two circuits, one circuit adapted to vibrate the armature of said relay automatically and independently of the transmitting means, the second circuit provided with transmitting means and adapted to change the sequence of said vibrations, in combination with means to connect said armature to the ground when said vibrations cease.

12. In telegraphy, in combination with a transmitting relay adapted to transmit true reversals, two converters, and means to energize each of said converters, the primary of said converters connected to one coil of said relay and the secondary of said converters connected to a second coil of said relay.

13. In quadruplex telegraphy, a line of transmission, a duplexing bridge therefor, two receiving stations operatively related to said bridge, each of said stations comprising a line relay connected to the cross wire of said bridge, a movable armature, and contacting means for said armature, each station also comprising a localized polar relay, two sources of current for said relay, one source of greater electromotive force than the other, and means operatively related to the armature of the line relay and its contact to shunt the source of greater electromotive force, in combination with a second local circuit adapted to be operated by said localized relay.

In testimony whereof I affix my signature in presence of two witnesses.

ISIDOR KITSEE.

Witnesses:
EDITH R. STILLEY,
MARY C. SMITH.

Copies of this patent may be obtained for five cents each, by addressing the "Commissioner of Patents, Washington, D. C."